US008934641B2

(12) United States Patent
Avendano et al.

(10) Patent No.: US 8,934,641 B2

(45) Date of Patent: Jan. 13, 2015

(54) SYSTEMS AND METHODS FOR RECONSTRUCTING DECOMPOSED AUDIO SIGNALS

(75) Inventors: Carlos Avendano, Campbell, CA (US); Ludger Solbach, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 1328 days.

(21) Appl. No.: 12/319,107

(22) Filed: Dec. 31, 2008

(65) Prior Publication Data

US 2010/0094643 A1 Apr. 15, 2010

Related U.S. Application Data

(63) Continuation-in-part of application No. 11/441,675, filed on May 25, 2006.

(51) Int. Cl.

| | |
|---|---|
| ***H04B 15/00*** | (2006.01) |
| ***G10L 19/00*** | (2013.01) |
| ***G10L 21/02*** | (2013.01) |
| ***G10L 19/02*** | (2013.01) |
| *G10L 25/18* | (2013.01) |

(52) U.S. Cl.

CPC ............. *G10L 19/0204* (2013.01); *G10L 25/18* (2013.01)

USPC ........................ 381/94.3; 704/200.1; 704/227

(58) Field of Classification Search

USPC ........ 381/94.1, 94.2, 94.3, 94.4, 98; 704/200, 704/200.1, 201, 224, 227

See application file for complete search history.

(56) References Cited

U.S. PATENT DOCUMENTS

| | | | |
|---|---|---|---|
| 3,976,863 | A | 8/1976 | Engel |
| 3,978,287 | A | 8/1976 | Fletcher et al. |
| 4,137,510 | A | 1/1979 | Iwahara |
| 4,433,604 | A | 2/1984 | Ott |
| 4,516,259 | A | 5/1985 | Yato et al. |
| 4,536,844 | A | 8/1985 | Lyon |
| 4,581,758 | A | 4/1986 | Coker et al. |
| 4,628,529 | A | 12/1986 | Borth et al. |
| 4,630,304 | A | 12/1986 | Borth et al. |

(Continued)

FOREIGN PATENT DOCUMENTS

| | | |
|---|---|---|
| JP | 62110349 | 5/1987 |
| JP | 4184400 | 7/1992 |

(Continued)

OTHER PUBLICATIONS

US Reg. No. 2,875,755 (Aug. 17, 2004).*

International Search Report dated May 29, 2003 in Application No. PCT/US03/04124.

International Search Report and Written Opinion dated Oct. 19, 2007 in Application No. PCT/US07/00463.

(Continued)

*Primary Examiner* — Duc Nguyen

*Assistant Examiner* — Kile Blair

(74) *Attorney, Agent, or Firm* — Carr & Ferrell LLP

(57) ABSTRACT

Systems and methods for reconstructing decomposed audio signals are presented. In exemplary embodiments, a decomposed audio signal is received. The decomposed audio signal may include a plurality of frequency sub-band signals having successively shifted group delays as a function of frequency from a filter bank. The plurality of frequency sub-band signals may then be grouped into two or more groups. A delay function may be applied to at least one of the two or more groups. Subsequently, the groups may be combined to reconstruct the audio signal, which may be outputted accordingly.

19 Claims, 6 Drawing Sheets

(56) References Cited

U.S. PATENT DOCUMENTS 4,649,505 A 3/1987 Zinser, Jr. et al.
4,658,426 A 4/1987 Chabries et al.
4,674,125 A 6/1987 Carlson et al.
4,718,104 A 1/1988 Anderson
4,811,404 A 3/1989 Vilmur et al.
4,812,996 A 3/1989 Stubbs
4,864,620 A 9/1989 Bialick
4,920,508 A 4/1990 Yassaie et al.
5,027,410 A 6/1991 Williamson et al.
5,054,085 A 10/1991 Meisel et al.
5,058,419 A 10/1991 Nordstrom et al.
5,099,738 A 3/1992 Hotz
5,119,711 A 6/1992 Bell et al.
5,142,961 A 9/1992 Paroutaud
5,150,413 A 9/1992 Nakatani et al.
5,175,769 A 12/1992 Hejna, Jr. et al.
5,187,776 A 2/1993 Yanker
5,208,864 A 5/1993 Kaneda
5,210,366 A 5/1993 Sykes, Jr.
5,230,022 A 7/1993 Sakata
5,319,736 A 6/1994 Hunt
5,323,459 A 6/1994 Hirano
5,341,432 A 8/1994 Suzuki et al.
5,381,473 A 1/1995 Andrea et al.
5,381,512 A 1/1995 Holton et al.
5,400,409 A 3/1995 Linhard
5,402,493 A 3/1995 Goldstein
5,402,496 A 3/1995 Soli et al.
5,471,195 A 11/1995 Rickman
5,473,702 A 12/1995 Yoshida et al.
5,473,759 A 12/1995 Slaney et al.
5,479,564 A 12/1995 Vogten et al.
5,502,663 A 3/1996 Lyon
5,544,250 A 8/1996 Urbanski
5,574,824 A 11/1996 Slyh et al.
5,583,784 A * 12/1996 Kapust et al. .................. 702/77
5,587,998 A 12/1996 Velardo, Jr. et al.
5,590,241 A 12/1996 Park et al.
5,602,962 A 2/1997 Kellermann
5,675,778 A 10/1997 Jones
5,682,463 A 10/1997 Allen et al.
5,694,474 A 12/1997 Ngo et al.
5,706,395 A 1/1998 Arslan et al.
5,717,829 A 2/1998 Takagi
5,729,612 A 3/1998 Abel et al.
5,732,189 A 3/1998 Johnston et al.
5,749,064 A 5/1998 Pawate et al.
5,757,937 A 5/1998 Itoh et al.
5,792,971 A 8/1998 Timis et al.
5,796,819 A 8/1998 Romesburg
5,806,025 A 9/1998 Vis et al.
5,809,463 A 9/1998 Gupta et al.
5,825,320 A 10/1998 Miyamori et al.
5,839,101 A 11/1998 Vahatalo et al.
5,920,840 A 7/1999 Satyamurti et al.
5,933,495 A 8/1999 Oh
5,943,429 A 8/1999 Handel
5,956,674 A 9/1999 Smyth et al.
5,974,380 A 10/1999 Smyth et al.
5,978,824 A 11/1999 Ikeda
5,983,139 A 11/1999 Zierhofer
5,990,405 A 11/1999 Auten et al.
6,002,776 A 12/1999 Bhadkamkar et al.
6,061,456 A 5/2000 Andrea et al.
6,072,881 A 6/2000 Linder
6,097,820 A 8/2000 Turner
6,108,626 A 8/2000 Cellario et al.
6,122,610 A 9/2000 Isabelle
6,134,524 A 10/2000 Peters et al.
6,137,349 A 10/2000 Menkhoff et al.
6,140,809 A 10/2000 Doi
6,173,255 B1 1/2001 Wilson et al.
6,180,273 B1 1/2001 Okamoto
6,216,103 B1 4/2001 Wu et al.
6,222,927 B1 4/2001 Feng et al.
6,223,090 B1 4/2001 Brungart
6,226,616 B1 5/2001 You et al.
6,263,307 B1 7/2001 Arslan et al.
6,266,633 B1 7/2001 Higgins et al.
6,317,501 B1 11/2001 Matsuo
6,339,758 B1 1/2002 Kanazawa et al.
6,355,869 B1 3/2002 Mitton
6,363,345 B1 3/2002 Marash et al.
6,381,570 B2 4/2002 Li et al.
6,430,295 B1 8/2002 Handel et al.
6,434,417 B1 8/2002 Lovett
6,449,586 B1 9/2002 Hoshuyama
6,469,732 B1 10/2002 Chang et al.
6,487,257 B1 11/2002 Gustafsson et al.
6,496,795 B1 12/2002 Malvar
6,513,004 B1 1/2003 Rigazio et al.
6,516,066 B2 2/2003 Hayashi
6,529,606 B1 3/2003 Jackson, Jr. II et al.
6,549,630 B1 4/2003 Bobisuthi
6,584,203 B2 6/2003 Elko et al.
6,622,030 B1 9/2003 Romesburg et al.
6,717,991 B1 4/2004 Gustafsson et al.
6,718,309 B1 4/2004 Selly
6,738,482 B1 5/2004 Jaber
6,760,450 B2 7/2004 Matsuo
6,785,381 B2 8/2004 Gartner et al.
6,792,118 B2 9/2004 Watts
6,795,558 B2 9/2004 Matsuo
6,798,886 B1 9/2004 Smith et al.
6,810,273 B1 10/2004 Mattila et al.
6,882,736 B2 4/2005 Dickel et al.
6,915,264 B2 7/2005 Baumgarte
6,917,688 B2 7/2005 Yu et al.
6,944,510 B1 9/2005 Ballesty et al.
6,978,159 B2 12/2005 Feng et al.
6,982,377 B2 1/2006 Sakurai et al.
6,999,582 B1 2/2006 Popovic et al.
7,016,507 B1 3/2006 Brennan
7,020,605 B2 3/2006 Gao
7,031,478 B2 4/2006 Belt et al.
7,054,452 B2 5/2006 Ukita
7,065,485 B1 6/2006 Chong-White et al.
7,076,315 B1 7/2006 Watts
7,092,529 B2 8/2006 Yu et al.
7,092,882 B2 8/2006 Arrowood et al.
7,099,821 B2 8/2006 Visser et al.
7,142,677 B2 11/2006 Gonopolskiy et al.
7,146,316 B2 12/2006 Alves
7,155,019 B2 12/2006 Hou
7,164,620 B2 1/2007 Hoshuyama
7,171,008 B2 1/2007 Elko
7,171,246 B2 1/2007 Mattila et al.
7,174,022 B1 2/2007 Zhang et al.
7,206,418 B2 4/2007 Yang et al.
7,209,567 B1 4/2007 Kozel et al.
7,225,001 B1 5/2007 Eriksson et al.
7,242,762 B2 7/2007 He et al.
7,246,058 B2 7/2007 Burnett
7,254,242 B2 8/2007 Ise et al.
7,359,520 B2 4/2008 Brennan et al.
7,412,379 B2 8/2008 Taori et al.
2001/0016020 A1 8/2001 Gustafsson et al.
2001/0031053 A1 10/2001 Feng et al.
2002/0002455 A1 1/2002 Accardi et al.
2002/0009203 A1 1/2002 Erten
2002/0041693 A1 4/2002 Matsuo
2002/0080980 A1 6/2002 Matsuo
2002/0106092 A1 8/2002 Matsuo
2002/0116187 A1 8/2002 Erten
2002/0133334 A1 9/2002 Coorman et al.
2002/0147595 A1 10/2002 Baumgarte
2002/0184013 A1 12/2002 Walker
2003/0014248 A1 1/2003 Vetter
2003/0026437 A1 2/2003 Janse et al.
2003/0033140 A1 2/2003 Taori et al.
2003/0039369 A1 2/2003 Bullen
2003/0040908 A1 2/2003 Yang et al.
2003/0061032 A1 3/2003 Gonopolskiy
2003/0063759 A1 4/2003 Brennan et al.

(56) References Cited

U.S. PATENT DOCUMENTS

| | | | |
|---|---|---|---|
| 2003/0072382 | A1 | 4/2003 | Raleigh et al. |
| 2003/0072460 | A1 | 4/2003 | Gonopolskiy et al. |
| 2003/0095667 | A1 | 5/2003 | Watts |
| 2003/0099345 | A1 | 5/2003 | Gartner et al. |
| 2003/0101048 | A1 | 5/2003 | Liu |
| 2003/0103632 | A1 | 6/2003 | Goubran et al. |
| 2003/0128851 | A1 | 7/2003 | Furuta |
| 2003/0138116 | A1 | 7/2003 | Jones et al. |
| 2003/0147538 | A1 | 8/2003 | Elko |
| 2003/0169891 | A1 | 9/2003 | Ryan et al. |
| 2003/0228023 | A1 | 12/2003 | Burnett et al. |
| 2004/0013276 | A1 | 1/2004 | Ellis et al. |
| 2004/0047464 | A1 | 3/2004 | Yu et al. |
| 2004/0057574 | A1 | 3/2004 | Faller |
| 2004/0078199 | A1 | 4/2004 | Kremer et al. |
| 2004/0131178 | A1 | 7/2004 | Shahaf et al. |
| 2004/0133421 | A1 | 7/2004 | Burnett et al. |
| 2004/0165736 | A1 | 8/2004 | Hetherington et al. |
| 2004/0196989 | A1 | 10/2004 | Friedman et al. |
| 2004/0263636 | A1 | 12/2004 | Cutler et al. |
| 2005/0025263 | A1 | 2/2005 | Wu |
| 2005/0027520 | A1 | 2/2005 | Mattila et al. |
| 2005/0049864 | A1 | 3/2005 | Kaltenmeier et al. |
| 2005/0060142 | A1 | 3/2005 | Visser et al. |
| 2005/0152559 | A1 | 7/2005 | Gierl et al. |
| 2005/0185813 | A1 | 8/2005 | Sinclair et al. |
| 2005/0213778 | A1 | 9/2005 | Buck et al. |
| 2005/0216259 | A1 | 9/2005 | Watts |
| 2005/0228518 | A1 | 10/2005 | Watts |
| 2005/0276423 | A1 | 12/2005 | Aubauer et al. |
| 2005/0288923 | A1 | 12/2005 | Kok |
| 2006/0072768 | A1 | 4/2006 | Schwartz et al. |
| 2006/0074646 | A1 | 4/2006 | Alves et al. |
| 2006/0098809 | A1 | 5/2006 | Nongpiur et al. |
| 2006/0120537 | A1 | 6/2006 | Burnett et al. |
| 2006/0133621 | A1 | 6/2006 | Chen et al. |
| 2006/0149535 | A1 | 7/2006 | Choi et al. |
| 2006/0184363 | A1 | 8/2006 | McCree et al. |
| 2006/0198542 | A1 | 9/2006 | Benjelloun Touimi et al. |
| 2006/0222184 | A1 | 10/2006 | Buck et al. |
| 2007/0021958 | A1 | 1/2007 | Visser et al. |
| 2007/0027685 | A1 | 2/2007 | Arakawa et al. |
| 2007/0033020 | A1 | 2/2007 | (Kelleher) Francois et al. |
| 2007/0067166 | A1 | 3/2007 | Pan et al. |
| 2007/0078649 | A1 | 4/2007 | Hetherington et al. |
| 2007/0094031 | A1 | 4/2007 | Chen |
| 2007/0100612 | A1 | 5/2007 | Ekstrand et al. |
| 2007/0116300 | A1 | 5/2007 | Chen |
| 2007/0150268 | A1 | 6/2007 | Acero et al. |
| 2007/0154031 | A1 | 7/2007 | Avendano et al. |
| 2007/0165879 | A1 | 7/2007 | Deng et al. |
| 2007/0195968 | A1 | 8/2007 | Jaber |
| 2007/0230712 | A1 | 10/2007 | Belt et al. |
| 2007/0276656 | A1 | 11/2007 | Solbach et al. |
| 2008/0019548 | A1 | 1/2008 | Avendano |
| 2008/0033723 | A1 | 2/2008 | Jang et al. |
| 2008/0140391 | A1 | 6/2008 | Yen et al. |
| 2008/0201138 | A1 | 8/2008 | Visser et al. |
| 2008/0228478 | A1 | 9/2008 | Hetherington et al. |
| 2008/0260175 | A1 | 10/2008 | Elko |
| 2009/0012783 | A1 | 1/2009 | Klein |
| 2009/0012786 | A1 | 1/2009 | Zhang et al. |
| 2009/0129610 | A1 | 5/2009 | Kim et al. |
| 2009/0220107 | A1 | 9/2009 | Every et al. |
| 2009/0238373 | A1 | 9/2009 | Klein |
| 2009/0253418 | A1 | 10/2009 | Makinen |
| 2009/0271187 | A1 | 10/2009 | Yen et al. |
| 2009/0323982 | A1 | 12/2009 | Solbach et al. |
| 2010/0278352 | A1 | 11/2010 | Petit et al. |
| 2011/0178800 | A1 | 7/2011 | Watts |

FOREIGN PATENT DOCUMENTS

| | | |
|---|---|---|
| JP | 5053587 | 3/1993 |
| JP | 6269083 | 9/1994 |
| JP | 10-313497 | 11/1998 |
| JP | 11-249693 | 9/1999 |
| JP | 2005110127 | 4/2005 |
| JP | 2005195955 | 7/2005 |
| WO | 01/74118 | 10/2001 |
| WO | 03/043374 | 5/2003 |
| WO | 03/069499 | 8/2003 |
| WO | 2007/081916 | 7/2007 |
| WO | 2007/140003 | 12/2007 |
| WO | 2010/005493 | 1/2010 |

OTHER PUBLICATIONS

International Search Report and Written Opinion dated Apr. 9, 2008 in Application No. PCT/US07/21654.

International Search Report and Written Opinion dated Sep. 16, 2008 in Application No. PCT/US07/12628.

International Search Report and Written Opinion dated Oct. 1, 2008 in Application No. PCT/US08/08249.

International Search Report and Written Opinion dated May 11, 2009 in Application No. PCT/US09/01667.

International Search Report and Written Opinion dated Aug. 27, 2009 in Application No. PCT/US09/03813.

International Search Report and Written Opinion dated May 20, 2010 in Application No. PCT/US09/06754.

Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.

Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.

Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.

Moulines, Eric et al., "Non-Parametric Techniques for Pitch-Scale and Time-Scale Modification of Speech", Speech Communication, vol. 16, pp. 175-205, 1995.

Verhelst, Werner, "Overlap-Add Methods for Time-Scaling of Speech", Speech Communication vol. 30, pp. 207-221, 2000.

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel et al. "Microphone Array Post-Filtering for Non-Stationary Noise Suppression", IEEE International Conference on Acoustics, Speech, and Signal Processing, May 2002, pp. 1-4.

(56) References Cited

OTHER PUBLICATIONS

Cohen, Israel, "Multichannel Post-Filtering in Nonstationary Noise Environments", IEEE Transactions on Signal Processing, vol. 52, No. 5, May 2004, pp. 1149-1160.
Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.
Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.
"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.
Fuchs, Martin et al. "Noise Suppression for Automotive Applications Based on Directional Information", 2004 IEEE International Conference on Acoustics, Speech, and Signal Processing, May 17-21, pp. 237-240.
Fulghum, D. P. et al., "LPC Voice Digitizer with Background Noise Suppression", 1979 IEEE International Conference on Acoustics, Speech, and Signal Processing, pp. 220-223.
Goubran, R.A. "Acoustic Noise Suppression Using Regression Adaptive Filtering", 1990 IEEE 40th Vehicular Technology Conference, May 6-9, pp. 48-53.
Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.
Haykin, Simon et al. "Appendix A.2 Complex Numbers." Signals and Systems. 2nd Ed. 2003. p. 764.
Hermansky, Hynek "Should Recognizers Have Ears?", In Proc. ESCA Tutorial and Research Workshop on Robust Speech Recognition for Unknown Communication Channels, pp. 1-10, France 1997.
Hohmann, V. "Frequency Analysis and Synthesis Using a Gammatone Filterbank", ACTA Acustica United with Acustica, 2002, vol. 88, pp. 433-442.
Jeffress, Lloyd A. et al. "A Place Theory of Sound Localization," Journal of Comparative and Physiological Psychology, 1948, vol. 41, p. 35-39.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Processing, Dec. 1991, vol. 39, No. 12, pp. 2573-2592.
Lazzaro, John et al., "A Silicon Model of Auditory Localization," Neural Computation Spring 1989, vol. 1, pp. 47-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug. 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.
Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al. "Convolutive Blind Separation of Non-Stationary Sources", IEEE Transactions on Speech and Audio Processing. vol. 8, No. 3, May 2008, pp. 320-327.
Rabiner, Lawrence R. et al. "Digital Processing of Speech Signals", (Prentice-Hall Series in Signal Processing). Upper Saddle River, NJ: Prentice Hall, 1978.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al. "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report dated Jun. 8, 2001 in Application No. PCT/US01/08372.
International Search Report dated Apr. 3, 2003 in Application No. PCT/US02/36946.

* cited by examiner

SYSTEMS AND METHODS FOR RECONSTRUCTING DECOMPOSED AUDIO SIGNALS

CROSS-REFERENCE TO RELATED APPLICATIONS

The present application is a continuation-in-part of U.S. patent application Ser. No. 11/441,675 filed May 25, 2006 and entitled "System and Method for Processing an Audio Signal," now U.S. Pat. No. 8,150,065, issued Apr. 3, 2012, the disclosure of which is incorporated herein by reference.

BACKGROUND OF THE INVENTION

1. Field of the Invention

The present invention relates generally to audio processing. More specifically, the present invention relates to reconstructing decomposed audio signals.

2. Related Art

Presently, filter banks are commonly used in signal processing to decompose signals into sub-components, such as frequency subcomponents. The sub-components may be separately modified and then be reconstructed as a modified signal. Due to a cascaded nature of the filter bank, the sub-components of the signal may have successive lags. In order to realign the sub-components for reconstruction, delays may be applied to each sub-component. As such, the sub-components may be aligned with a sub-component having the greatest lag. Unfortunately, this process introduces latency between the modified signal and the original signal that is, at a minimum, equal to that greatest lag.

In real-time applications, like telecommunications for example, excessive latency may unacceptably hinder performance. Standards, such as those specified by the 3$^{rd}$ Generation Partner Project (3GPP), require latency below a certain level. In an effort to reduce latency, techniques have been developed at the cost of performance by prior art systems.

SUMMARY OF THE INVENTION

Embodiments of the present invention provide systems and methods for reconstructing decomposed audio signals. In exemplary embodiments, a decomposed audio signal is received from a filter bank. The decomposed audio signal may comprise a plurality of frequency sub-band signals having successively shifted group delays as a function of frequency. The plurality of frequency sub-band signals may be grouped into two or more groups. According to exemplary embodiments, the two or more groups may not overlap.

A delay function may be applied to at least one of the two or more groups. In exemplary embodiments, applying the delay function may realign the group delays of the frequency sub-band signals in at least one of the two or more groups. The delay function, in some embodiments, may be based, at least in part, on a psychoacoustic model. Furthermore, the delay function may be defined using a delay table.

The groups may then be combined to reconstruct the audio signal. In some embodiments, one or more of a phase or amplitude of each of the plurality of frequency sub-band signals may be adjusted. The combining may comprise summing the two or more groups. Finally, the audio signal may be outputted.

DETAILED DESCRIPTION OF EXEMPLARY EMBODIMENTS

Embodiments of the present invention provide systems and methods for reconstructing a decomposed audio signal. Particularly, these systems and methods reduce latency while substantially preserving performance. In exemplary embodiments, sub-components of a signal received from a filter bank are disposed into groups and delayed in a discontinuous manner, group by group, prior to reconstruction.

Figure 1:
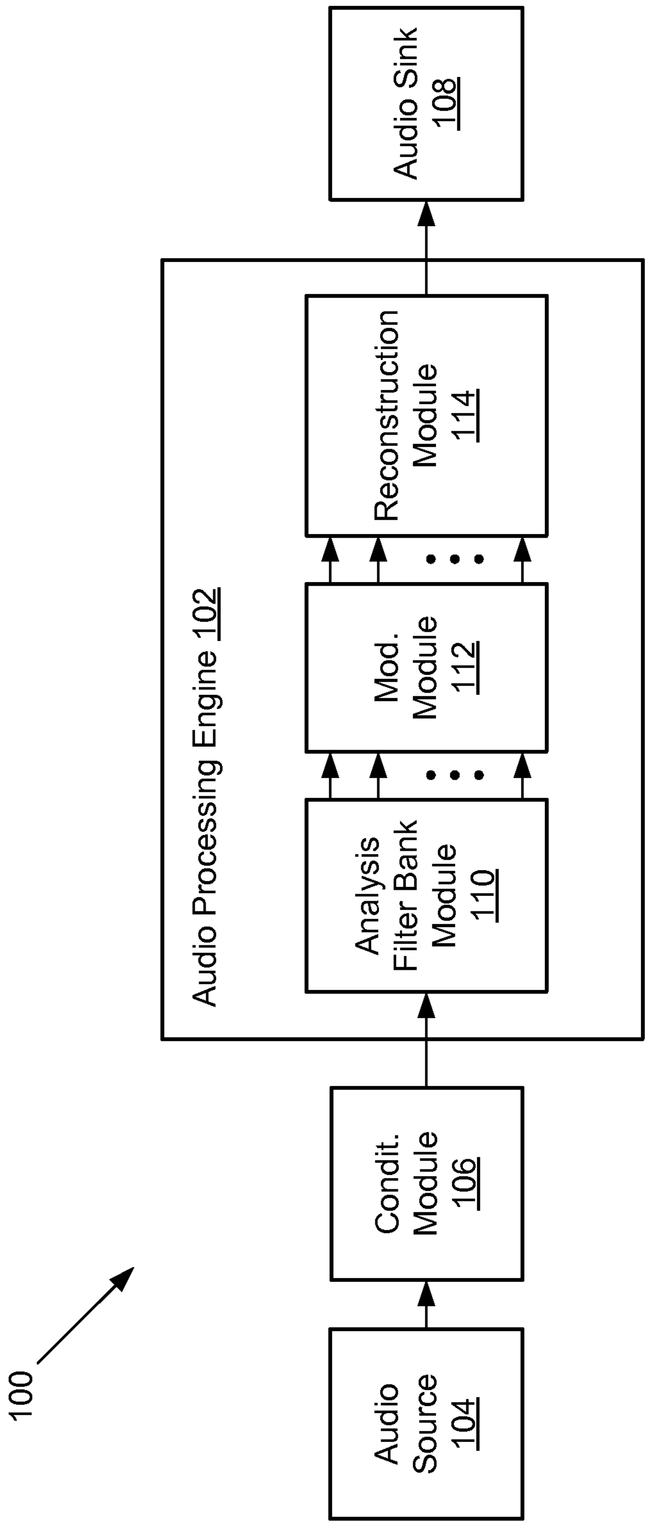
FIG. 1 is an exemplary block diagram of a system employing embodiments of the present invention.

Referring to FIG. 1, an exemplary system 100 in which embodiments of the present invention may be practiced is shown. The system 100 may be any device, such as, but not limited to, a cellular phone, hearing aid, speakerphone, telephone, computer, or any other device capable of processing audio signals. The system 100 may also represent an audio path of any of these devices.

In exemplary embodiments, the system 100 comprises an audio processing engine 102, an audio source 104, a conditioning module 106, and an audio sink 108. Further components not related to reconstruction of the audio signal may be provided in the system 100. Additionally, while the system 100 describes a logical progression of data from each component of FIG. 1 to the next, alternative embodiments may comprise the various components of the system 100 coupled via one or more buses or other elements.

The exemplary audio processing engine 102 processes the input (audio) signals received from the audio source 104. In one embodiment, the audio processing engine 102 comprises software stored on a device which is operated upon by a general processor. The audio processing engine 102, in various embodiments, comprises an analysis filter bank module 110, a modification module 112, and a reconstruction module 114. It should be noted that more, less, or functionally equivalent modules may be provided in the audio processing engine 102. For example, one or more the modules 110-114 may be combined into few modules and still provide the same functionality.

The audio source 104 comprises any device which receives input (audio) signals. In some embodiments, the audio source 104 is configured to receive analog audio signals. In one example, the audio source 104 is a microphone coupled to an analog-to-digital (A/D) converter. The microphone is configured to receive analog audio signals while the A/D converter samples the analog audio signals to convert the analog audio signals into digital audio signals suitable for further processing. In other examples, the audio source 104 is configured to receive analog audio signals while the conditioning module 106 comprises the A/D converter. In alternative embodiments, the audio source 104 is configured to receive digital audio signals. For example, the audio source 104 is a disk device capable of reading audio signal data stored on a hard disk or other forms of media. Further embodiments may utilize other forms of audio signal sensing/capturing devices.

The exemplary conditioning module 106 pre-processes the input signal (i.e., any processing that does not require decomposition of the input signal). In one embodiment, the conditioning module 106 comprises an auto-gain control. The conditioning module 106 may also perform error correction and noise filtering. The conditioning module 106 may comprise other components and functions for pre-processing the audio signal.

The analysis filter bank module 110 decomposes the received input signal into a plurality of sub-components or sub-band signals. In exemplary embodiments, each sub-band signal represents a frequency component and is termed as a frequency sub-band. The analysis filter bank module 110 may include many different types of filter banks and filters in accordance with various embodiments (not depicted in FIG. 1). In one example, the analysis filter bank module 110 may comprise a linear phase filter bank.

In some embodiments, the analysis filter bank module 110 may include a plurality of complex-valued filters. These filters may be first order filters (e.g., single pole, complex-valued) to reduce computational expense as compared to second and higher order filters. Additionally, the filters may be infinite impulse response (IIR) filters with cutoff frequencies designed to produce a desired channel resolution. In some embodiments, the filters may perform Hilbert transforms with a variety of coefficients upon the complex audio signal in order to suppress or output signals within specific frequency sub-bands. In other embodiments, the filters may perform fast cochlear transforms. The filters may be organized into a filter cascade whereby an output of one filter becomes an input in a next filter in the cascade, according to various embodiments. Sets of filters in the cascade may be separated into octaves. Collectively, the outputs of the filters represent the frequency sub-band components of the audio signal.

The exemplary modification module 112 receives each of the frequency sub-band signals over respective analysis paths from the analysis filter bank module 110. The modification module 112 can modify/adjust the frequency sub-band signals based on the respective analysis paths. In one example, the modification module 112 suppresses noise from frequency sub-band signals received over specific analysis paths. In another example, a frequency sub-band signal received from specific analysis paths may be attenuated, suppressed, or passed through a further filter to eliminate objectionable portions of the frequency sub-band signal.

The reconstruction module 114 reconstructs the modified frequency sub-band signals into a reconstructed audio signal for output. In exemplary embodiments, the reconstruction module 114 performs phase alignment on the complex frequency sub-band signals, performs amplitude compensation, cancels complex portions, and delays remaining real portions of the frequency sub-band signals during reconstruction in order to improve resolution or fidelity of the reconstructed audio signal. The reconstruction module 114 will be discussed in more detail in connection with FIG. 2.

The audio sink 108 comprises any device for outputting the reconstructed audio signal. In some embodiments, the audio sink 108 outputs an analog reconstructed audio signal. For example, the audio sink 108 may comprise a digital-to-analog (D/A) converter and a speaker. In this example, the D/A converter is configured to receive and convert the reconstructed audio signal from the audio processing engine 102 into the analog reconstructed audio signal. The speaker can then receive and output the analog reconstructed audio signal. The audio sink 108 can comprise any analog output device including, but not limited to, headphones, ear buds, or a hearing aid. Alternately, the audio sink 108 comprises the D/A converter and an audio output port configured to be coupled to external audio devices (e.g., speakers, headphones, ear buds, hearing aid.)

In alternative embodiments, the audio sink 108 outputs a digital reconstructed audio signal. For example, the audio sink 108 may comprise a disk device, wherein the reconstructed audio signal may be stored onto a hard disk or other storage medium. In alternate embodiments, the audio sink 108 is optional and the audio processing engine 102 produces the reconstructed audio signal for further processing (not depicted in FIG. 1).

Figure 2:
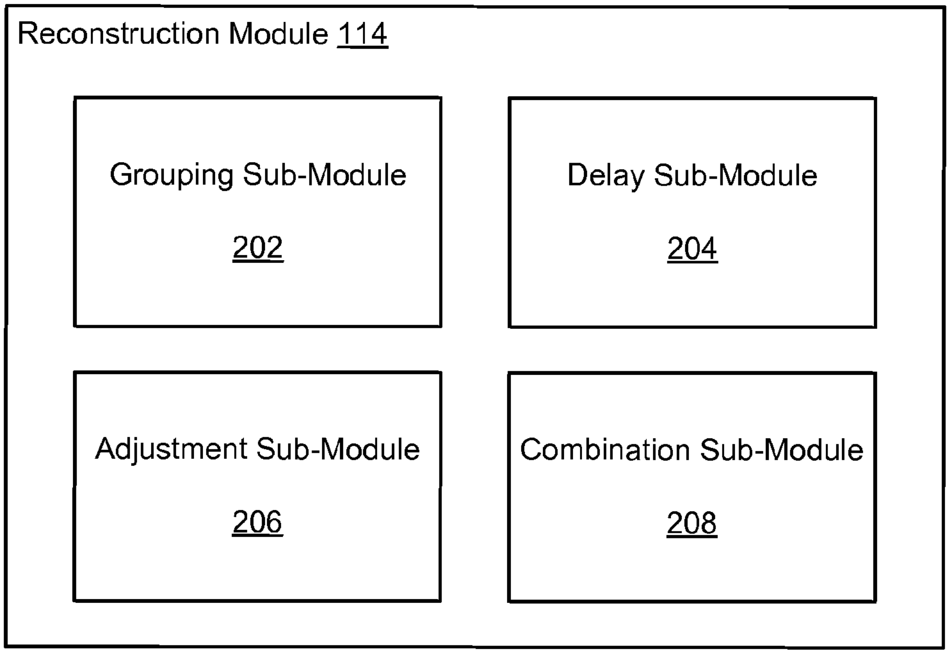
FIG. 2 illustrates an exemplary reconstruction module in detail.

Referring now to FIG. 2, the exemplary reconstruction module 114 is shown in more detail. The reconstruction module 114 may comprise a grouping sub-module 202, a delay sub-module 204, an adjustment sub-module 206, and a combination sub-module 208. Although FIG. 2 describes the reconstruction module 114 as including various sub-modules, fewer or more sub-modules may be included in the reconstruction module 114 and still fall within the scope of various embodiments. Additionally, various sub-modules of the reconstruction module 114 may be combined into a single sub-module. For example, functionalities of the grouping sub-module 202 and the delay sub-module 204 may be combined into one sub-module.

The grouping sub-module 202 may be configured to group the plurality of frequency sub-band signals into two or more groups. In exemplary embodiments, the frequency sub-band signals embodied within each group include frequency sub-band signals from adjacent frequency bands. In some embodiments, the groups may overlap. That is, one or more frequency sub-band signals may be included in more than one group in some embodiments. In other embodiments, the groups do not overlap. The number of groups designated by the grouping sub-module 202 may be optimized based on computational complexity, signal quality, and other considerations. Furthermore, the number of frequency sub-bands included in each group may vary from group to group or be the same for each group.

The delay sub-module 204 may be configured to apply a delay function to at least one of the two or more groups. The delay function may determine a period of time to delay each frequency sub-band signal included in the two or more groups. In exemplary embodiments, the delay function is applied to realign group delays of the frequency sub-band signals in at least one of the two or more groups. The delay function may be based, at least in part, on a psychoacoustic model. Generally speaking, psychoacoustic models treat subjective or psychological aspects of acoustic phenomena, such as perception of phase shift in audio signals and sensitivity of a human ear. Additionally, the delay function may be defined using a delay table, as further described in connection with FIG. 3.

The adjustment sub-module 206 may be configured to adjust one or more of a phase or amplitude of the frequency sub-band signals. In exemplary embodiments, these adjustments may minimize ripples, such as in a transfer function, produced during reconstruction. The phase and amplitude may be derived for any sample by the adjustment sub-module 206. Thus, the reconstruction of the audio signal is mathematically made easier. As a result of this approach, the amplitude and phase for any sample is readily available for further processing. According to some embodiments, the adjustment sub-module 206 is configured to cancel, or otherwise remove, the imaginary portion of each frequency sub-band signal.

The combination sub-module 208 may be configured to combine the groups to reconstruct the audio signal. According to exemplary embodiments, real portions of the frequency sub-band signals are summed to generate a reconstructed audio signal. Other methods for reconstructing the audio signal, however, may be used by the combination sub-module 208 in alternative embodiments. The reconstructed audio signal may then be outputted by the audio sink 108 or be subjected to further processing.

Figure 3:
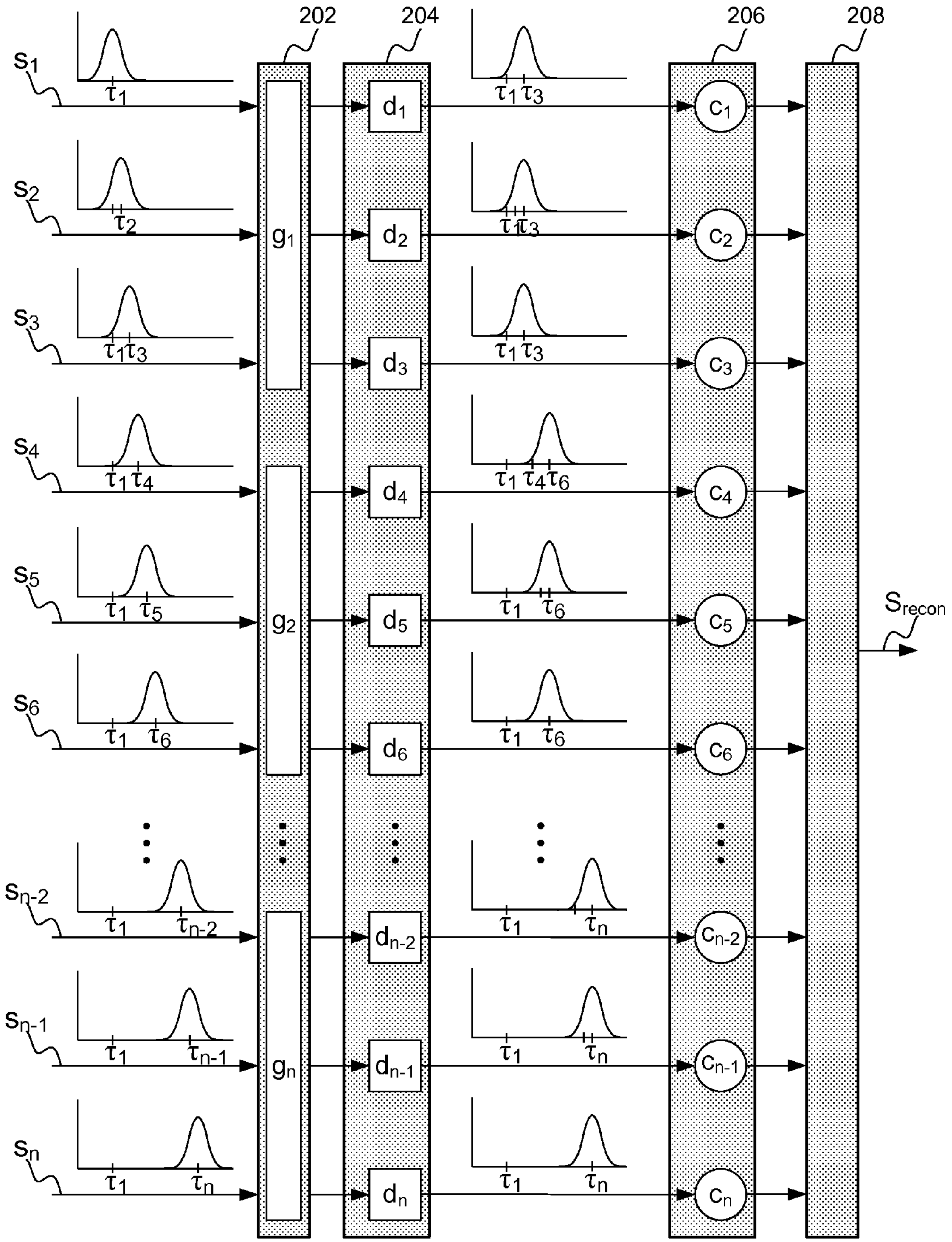
FIG. 3 is a diagram illustrating signal flow within the reconstruction module in accordance with exemplary embodiments.

FIG. 3 is a diagram illustrating signal flow within the reconstruction module 114 in accordance with one example. From left to right, as depicted, frequency sub-band signals $s_1$-$s_n$ are received and grouped by the grouping sub-module 202, delayed by the delay sub-module 204, adjusted by the adjustments sub-module 206, and reconstructed by the combination sub-module 208, as further described herein. The frequency sub-band signals $s_1$-$s_n$ may be received from the analysis filter bank module 110 or the modification module 112, in accordance with various embodiments.

The frequency sub-band signals, as received by the grouping sub-module 202, have successively shifted group delays as a function of frequency, as illustrated by plotted curves associated with each of the frequency sub-band signals. The curves are centered about time $\tau_1$-$\tau_n$ for frequency sub-band signals $s_1$-$s_n$, respectively. Relative to the frequency sub-band signal $s_1$, each successive frequency sub-band signal $s_x$ lags by a time $\tau(s_x)=\tau_x-\tau_1$, where x=2, 3, 4, . . . , n. For example, frequency sub-band signal S6 lags frequency sub-band signal $s_1$ by a time $\tau(s_6)=\tau_6-\tau_1$. Actual values of the lag times $\tau(s_x)$ may depend on which types of filters are included in the analysis filter bank module 110, delay characteristics of such filters, how the filters are arranged, and a total number of frequency sub-band signals, among other factors.

As depicted in FIG. 3, the grouping sub-module 202 groups the frequency sub-band signal into groups of three, wherein groups $g_1$, $g_2$, and so forth, through $g_n$ comprise the frequency sub-band signals $s_1$-$s_3$, the frequency sub-band signals $s_4$-$s_6$, and so forth, through the frequency sub-band signals $s_{n-2}$-$s_n$, respectively. According to exemplary embodiments, the grouping sub-module 202 may group the frequency sub-band signals into any number of groups. Consequently, any number of frequency sub-band signals may be included in any one given group, such that the groups do not necessarily comprise an equal number of frequency sub-band signals. Furthermore, the groups may be overlapping or non-overlapping and include frequency sub-band signals from adjacent frequency bands.

After the frequency sub-band signals $s_1$-$s_n$ are divided into groups by the grouping sub-module 202, the delay sub-module 204 may apply delays $d_1$-$d_n$ to the frequency sub-band signals $s_1$-$s_n$. As depicted, the frequency sub-band signals included in each group are delayed so as to be aligned with the frequency sub-band signal having the greatest lag time $\tau(s_x)$ within the group. For example, the frequency sub-band signals $s_1$ and $s_2$ are delayed to be aligned with the frequency sub-band signal $s_3$. The frequency sub-band signals $s_1$-$s_n$ are delayed as described in Table 1.

TABLE 1

| Sub-band signal | Delay |
|---|---|
| $S_1$ | $d_1 = \tau_3 - \tau_1$ |
| $S_2$ | $d_2 = \tau_3 - \tau_2$ |
| $S_3$ | $d_3 = 0$ |
| $S_4$ | $d_4 = \tau_6 - \tau_4$ |
| $S_5$ | $d_5 = \tau_6 - \tau_5$ |

TABLE 1-continued

| Sub-band signal | Delay |
|---|---|
| $S_6$ | $d_6 = 0$ |
| . | . |
| . | . |
| . | . |
| $S_{n-2}$ | $d_{n-2} = \tau_n - \tau_{n-2}$ |
| $S_{n-1}$ | $d_{n-1} = \tau_n - \tau_{n-1}$ |
| $S_n$ | $d_n = 0$ |

Figure 4:
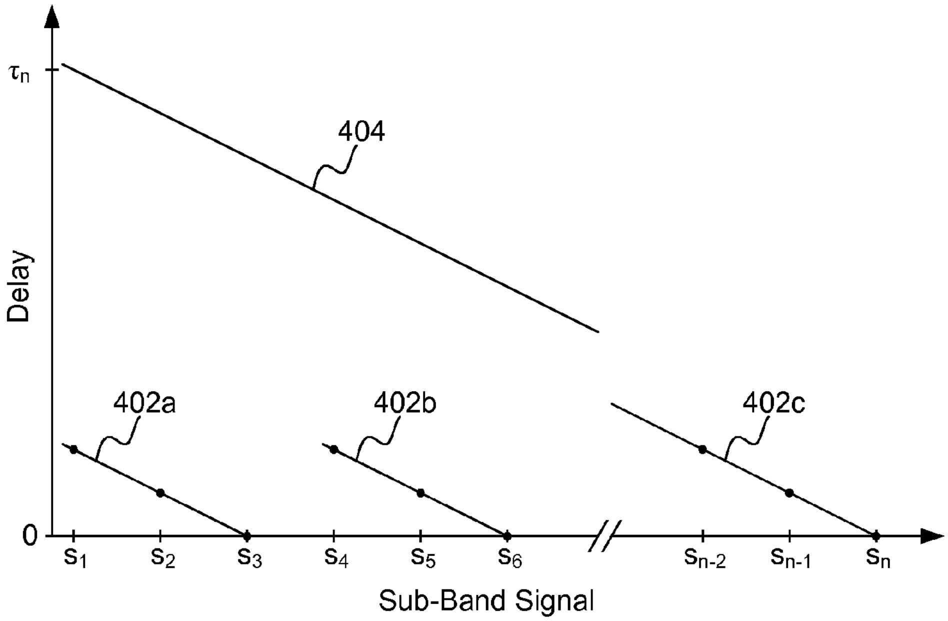
FIG. 4 displays an exemplary delay function.

FIG. 4 displays an exemplary delay function 402. The delay function 402 comprises a delay function segment 402*a*, a delay function segment 402*b*, and a delay function segment 402*c* that correspond to the groups comprising the frequency sub-band signals $s_1$-$s_3$, the frequency sub-band signals $s_4$-$s_6$, and the frequency sub-band signals $s_{n-2}$-$s_n$, respectively, as described in Table 1. Although the delay function segments 402*a*-402*c* are depicted as linear, any type of function may be applied depending on the values of the lag times $\tau(s_x)$, in accordance with various embodiments.

It is noted that for full delay compensation of all of the frequency sub-band signals, a delay function 404 may be invoked, wherein the delay function 404 coincides with the delay function segment 402*c*. The full delay compensation would result in the frequency sub-band signals $s_1$-$s_{n-1}$ being delayed so as to be aligned with the frequency sub-band signal $s_n$.

Again referring to FIG. 3, the adjustment sub-module 206 may perform computations $c_1$-$c_n$ on the frequency sub-band signals $s_1$-$s_n$. The computations $c_1$-$c_n$ may be performed to adjust one or more of a phase or amplitude of the frequency sub-band signals $s_1$-$s_n$. According to various embodiments, the computations $c_1$-$c_n$ may include a derivation of the phase and amplitude, as well as cancellation of the imaginary portions, of each of the frequency sub-band signals $s_1$-$s_n$.

The combination sub-module 208, as depicted in FIG. 3, combines the frequency sub-band signals $s_1$-$s_n$ to generate a reconstructed audio signal $S_{recon}$. According to exemplary embodiments, the real portions of the frequency sub-band signals $s_1$-$s_n$ are summed to generate the reconstructed audio signal $S_{recon}$. Finally, the reconstructed audio signal $S_{recon}$ may be outputted, such as by the audio sink 108 or be subjected to further processing.

Figure 5:
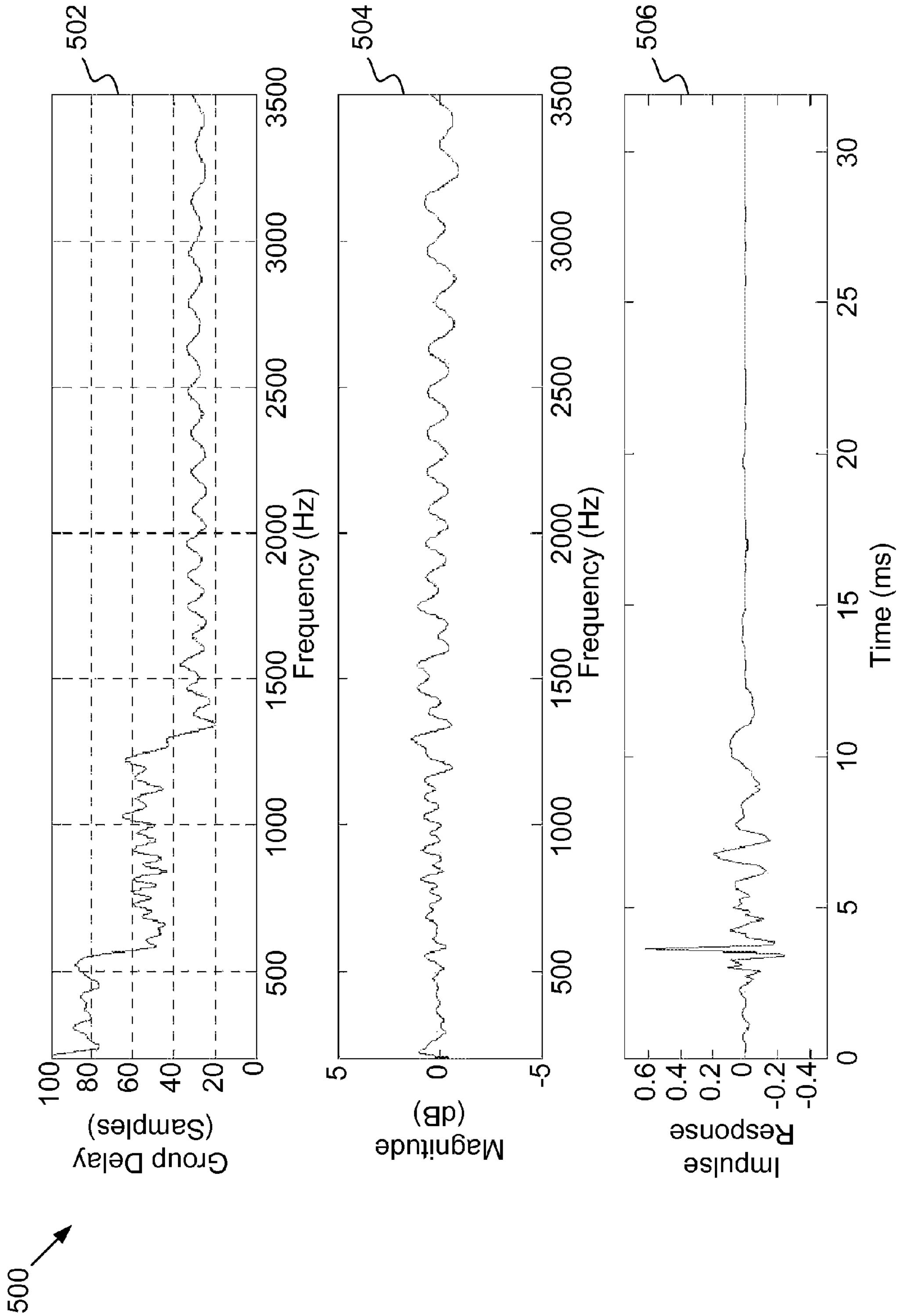
FIG. 5 presents exemplary characteristics of a reconstructed audio signal.

FIG. 5 presents characteristics 500 of an exemplary audio signal reconstructed from three groups of frequency sub-band signals. The characteristics 500 include group delay versus frequency 502, magnitude versus frequency 504, and impulse response versus time 506.

Figure 6:
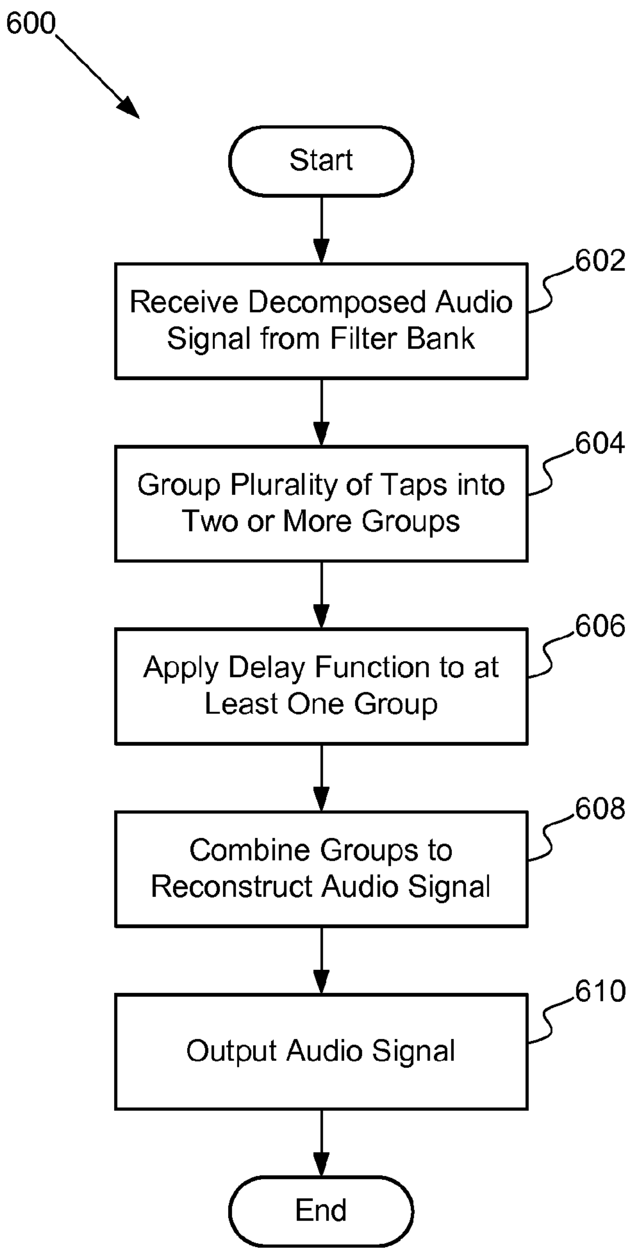
FIG. 6 is a flowchart of an exemplary method for reconstructing a decomposed audio signal.

FIG. 6 is a flowchart 600 of an exemplary method for reconstructing a decomposed audio signal. The exemplary method described by the flowchart 600 may be performed by the audio processing engine 102, or by modules or sub-modules therein, as described below. In addition, steps of the flowchart 600 may be performed in varying orders or concurrently. Additionally, various steps may be added, subtracted, or combined in the exemplary method described by the flowchart 600 and still fall within the scope of the present invention.

In step 602, a decomposed audio signal is received from a filter bank, wherein the decomposed audio signal comprises a plurality of frequency sub-band signals having successively shifted group delays as a function of frequency. An example of the successively shifted group delays is illustrated by the plotted curves associated with the frequency sub-band signals $s_1$-$s_n$ shown in FIG. 3. The plurality of frequency sub-band signals may be received by the reconstruction module 114 or by sub-modules included therein. Additionally, the plurality of frequency sub-band signals may be received from the analysis filter bank module 110 or the modification module 112, in accordance with various embodiments.

In step 604, the plurality of frequency sub-band signals is grouped into two or more groups. According to exemplary embodiments, the grouping sub-module 202 may perform step 604. In addition, any number of the plurality of frequency sub-band signals may be included in any one given group. Furthermore, the groups may be overlapping or non-overlapping and include frequency sub-band signals from adjacent frequency bands, in accordance with various embodiments.

In step 606, a delay function is applied to at least one of the two or more groups. The delay sub-module 204 may apply the delay function to at least one of the two or more groups in exemplary embodiments. As illustrated in connection with FIG. 3, the delay function may determine a period of time to delay each frequency sub-band signal included in the two or more groups in order to realign the group delays of some or all of the plurality of frequency sub-band signals. In one example, the plurality of frequency sub-band signals are delayed such that the group delays of frequency sub-band signals in each of the two or more groups are aligned with the frequency sub-band signal having the greatest lag time in each respective group. In some embodiments, the delay function may be based, at least in part, on a psychoacoustic model. Furthermore, a delay table (see, e.g., Table 1) may be used to define the delay function in some embodiments.

In step 608, the groups are combined to reconstruct the audio signal. In accordance with exemplary embodiments, the combination sub-module 208 may perform the step 608. The real portions of the plurality of frequency sub-band signals may be summed to reconstruct the audio signal in some embodiment. In other embodiments, however, various methods for reconstructing the audio signal may also be used.

In step 610, the audio signal is outputted. According to some embodiments, the audio signal may be outputted by the audio sink 108. In other embodiments, the audio signal may be subjected to further processing.

The above-described engines, modules, and sub-modules may be comprised of instructions that are stored in storage media such as a machine readable medium (e.g., a computer readable medium). The instructions may be retrieved and executed by a processor. Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processors, and storage media.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for reconstructing a decomposed audio signal, comprising:

receiving, using a processor a plurality of frequency sub-band signals from a filter bank, the filter bank decomposing an audio signal into the plurality of frequency sub-band signals, the plurality of frequency sub-band signals comprising:

a first frequency sub-band signal received from the filter bank, a second frequency sub-band signal received, from the filter bank, having a first lag time from the first frequency sub-band signal, a third frequency sub-band signal received from the filter bank, having a second lag time from the second frequency sub-band signal, and additional frequency sub-band signals each received, from the filter bank, having a respective lag time from a frequency sub-band signal of the plurality of frequency sub-band signals;

grouping, using the processor, the plurality of frequency sub-band signals into two or more groups;

delaying, using the processor, the two or more groups by a delay function, the delay function delaying by a different delay of a plurality of delays each frequency sub-band signal in each group of the two or more groups, such that each frequency sub-band signal in each group is aligned with the frequency sub-band signal having a greatest lag time in each group, the plurality of delays including a zero delay; and combining, using the processor, the groups to reconstruct the audio signal.

2. The method of claim 1, further comprising adjusting, using the processor, one or more of a phase or amplitude of at least one of the plurality of frequency sub-band signals.

3. The method of claim 1, wherein the delay function is based, at least in part, on a psychoacoustic model.

4. The method of claim 1, further comprising defining the delay function using a delay table.

5. The method of claim 1, wherein the two or more groups do not overlap.

6. The method of claim 1, wherein the combining comprises summing the two or more groups.

7. A system for reconstructing a decomposed audio signal, comprising:

a reconstruction module, using a processor, configured to receive a decomposed audio signal comprising a plurality of frequency sub-band signals from a filter bank, the plurality of frequency sub-band signals comprising:

a first frequency sub-band signal received from the filter bank, a second frequency sub-band signal received, from the filter bank, having a first lag time from the first frequency sub-band signal, a third frequency sub-band signal received, from the filter bank, having a second lag time from the second frequency sub-band signal, and additional frequency sub-band signals each received, from the filter bank, having a respective lag time from a frequency sub-band signal of the plurality of frequency sub-band signals, the reconstruction module comprising:

a grouping sub-module configured to group the plurality of frequency sub-band signals into two or more groups, a delay sub-module configured to delay the two or more groups by a delay function, the delay function delaying by a different delay of a plurality of delays each frequency sub-band in each group of the two or more groups, such that each frequency sub-band signal in each group is aligned with the frequency sub-band signal having a greatest lag time in each group, the plurality of delays including a zero delay, and a combination sub-module configured to combine the groups to reconstruct the audio signal.

8. The system of claim 7, wherein the reconstruction module further comprises an adjustment sub-module configured to adjust one or more of a phase or amplitude of at least one of the plurality of frequency sub-band signals.

9. The system of claim 7, wherein the delay function is based, at least in part, on a psychoacoustic model.

10. The system of claim 7, wherein the delay function is defined using a delay table.

11. The system of claim 7, wherein the combination sub-module is further configured to sum the two or more groups.

12. The system of claim 7, further comprising a fast cochlear transform filter bank, the fast cochlear transform filter bank being stored in a memory and running on the processor, and providing the decomposed audio signal.

13. The system of claim 7, further comprising a linear phase filter bank, the linear phase filter bank being stored in a memory and running on the processor, and providing the decomposed audio signal.

14. The system of claim 7, further comprising a complex-valued filter bank, the complex-valued filter bank being configured to operate on complex-valued inputs and being stored in a memory and running using the processor, and providing the decomposed audio signal.

15. A non-transitory computer readable storage medium having embodied thereon a program, the program being executable by a processor to perform a method for reconstructing a decomposed audio signal, the method comprising:

receiving a decomposed audio signal comprising a plurality of frequency sub-band signals from a filter bank, the plurality of frequency sub-band signals comprising:

a first frequency sub-band signal received from the filter bank, a second frequency sub-band signal received, from the filter bank, having a first lag time from the first frequency sub-band signal, a third frequency sub-band signal received, from the filter bank, having a second lag time from the second frequency sub-band signal, and additional frequency sub-band signals each received, from the filter bank, having a respective lag time from a frequency sub-band signal of the plurality of frequency sub-band signals;

grouping the plurality of frequency sub-band signals into two or more groups;

delaying the two or more groups by a delay function, the delay function delaying by a different delay of a plurality of delays each frequency sub-band signal in each group of the two or more groups, such that each frequency sub-band signal in the each group is aligned with the frequency sub-band signal having a greatest received lag time in each group, the plurality of delays including a zero delay; and combining the groups to reconstruct the audio signal.

16. The non-transitory computer readable medium of claim 15, further comprising adjusting one or more of a phase or amplitude of each of the plurality of frequency sub-band signals.

17. The non-transitory computer readable medium of claim 15, wherein the delay function is based, at least in part, on a psychoacoustic model.

18. The non-transitory computer readable medium of claim 15, further comprising defining the delay function using a delay table.

19. A method for reconstructing a decomposed audio signal, comprising:

receiving, using a processor, a decomposed audio signal comprising a plurality of frequency sub-band signals from a filter bank, the plurality of frequency sub-band signals comprising:

a first frequency sub-band signal received from the filter bank, the first frequency sub-band being substantially centered about a first time, a second frequency sub-band signal, received from the filter bank, having a first lag time from the first frequency sub-band signal, the second frequency sub-band being substantially centered about a second time, such that the first lag time is a difference between the first time and the second time, a third frequency sub-band signal, received from the filter bank, having a second lag time from the second frequency sub-band signal, the third frequency sub-band being substantially centered about a third time, such that the second lag time is a difference between the second time and the third time, and additional frequency sub-band signals each received, from the filter bank, having a respective lag time from a frequency sub-band signal of the plurality of frequency sub-band signals;

grouping, using the processor, the plurality of frequency sub-band signals into two or more groups;

delaying, using the processor, the two or more groups by a delay function, the delay function delaying by a different delay of a plurality of delays each frequency sub-band signal in each group of the two or more groups, such that each frequency sub-band signal in each group is aligned with the frequency sub-band signal in each group having a greatest lag time, the plurality of delays including a zero delay, the delay function being based on at least in part on a psychoacoustic model or defined using a delay table; and combining, using the processor, the groups to reconstruct the audio signal.

* * * * *